Aug. 4, 1959

R. E. LOWE 2,897,691

VARIABLE SPEED TRANSMISSION

Filed March 1, 1957

INVENTOR.
ROBERT E. LOWE
BY
McMorrow, Berman + Davidson
ATTORNEYS

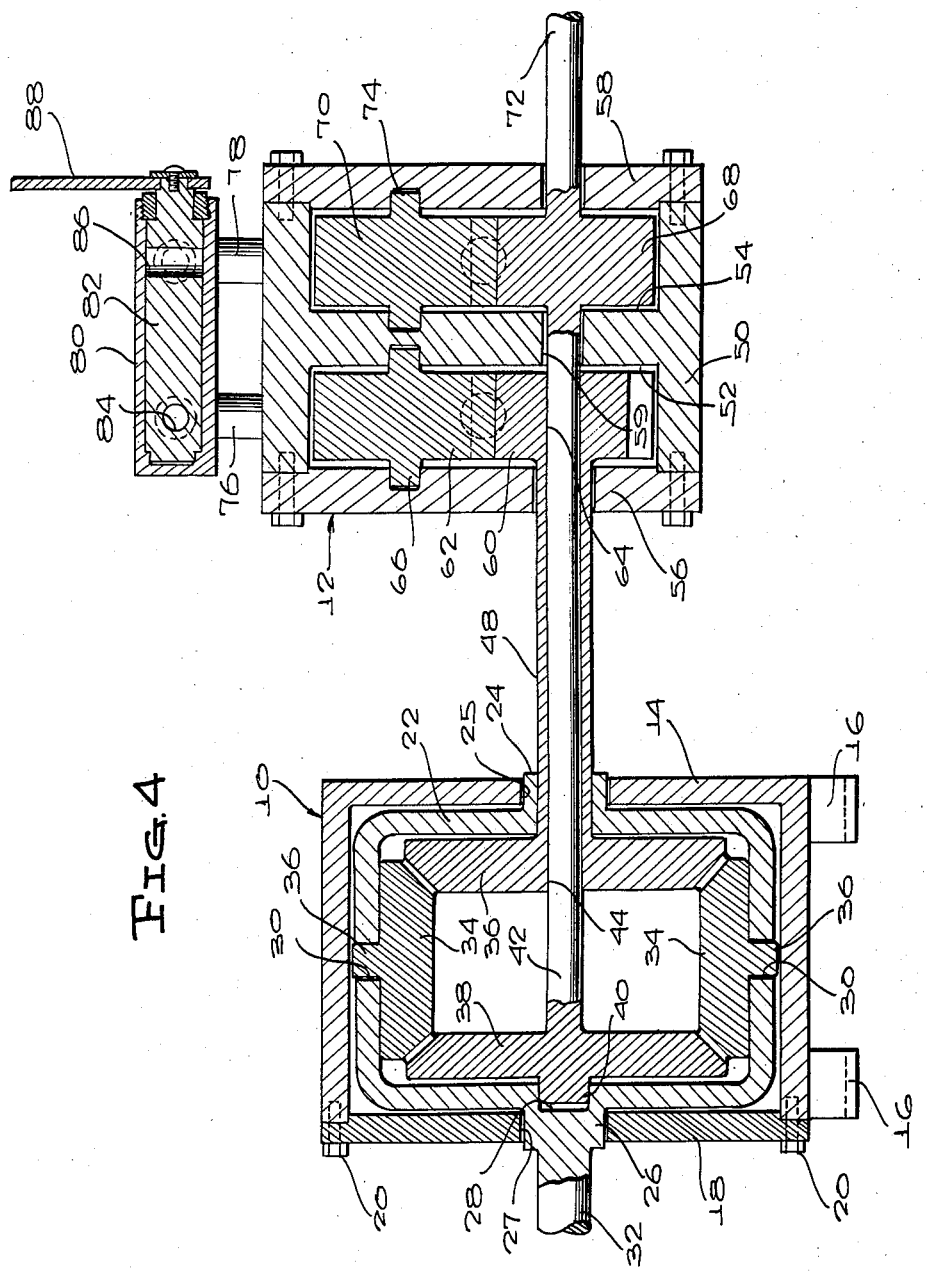

United States Patent Office 2,897,691
Patented Aug. 4, 1959

2,897,691

VARIABLE SPEED TRANSMISSION

Robert E. Lowe, Kansas City, Mo.

Application March 1, 1957, Serial No. 643,329

4 Claims. (Cl. 74—757)

This invention relates to a variable speed transmission, and has for its main object the provision of a generally improved device of this type, so designed that a drive and a pair of driven shafts can be all conjointly rotated at he same speed, or either driven shaft driven at a greater speed than that of the drive shaft.

A more specific object is to provide a variable speed transmission that is adapted for use in any mechanism in which a variation in the speed of one shaft as compared to the speed of another shaft is desired. Thus, while the invention has particular application for automatic transmissions of vehicles, where it could act as a transmission and overdrive, it has general application in any mechanism in which drive is transmitted through a rotating shaft or shafts, and wherein changes in the relative speeds of relatively rotatable shafts are needed.

A further object is to provide a variable speed transmission that will be simply designed, with a comparatively small number of parts so designed as to facilitate assembly and disassembly of the structure, and further designed to permit manufacture at low cost, facilitate maintenance and repair, and provide a variable speed transmission that will be rugged and so designed as not to readily get out of order.

A further object of importance is to provide a variable speed transmission as described wherein the relative speeds of the shafts are readily controlled by a valve assembly, a conduit for pressure fluid through which the pressure fluid will flow under the control of the valve assembly, and a pump through which the pressure fluid is circulated, the pump being of the single or multiple type, and being so designed as to effect the changes in relative speed of the shafts speedily and with a minimum loss of power.

Still another object is to provide a device of the character stated that will be relatively compact, and will be particularly adapted for manufacture from components which, for the most part, are already known and in use in other mechanical environments.

Other objects will appear from the following description, the claims appended thereto, and from the annexed drawing, in which like reference characters designate like parts throughout the several views, and wherein:

Figure 4 is a longitudinal sectional view, on an enlarged scale, through the complete structure.

Figure 1:
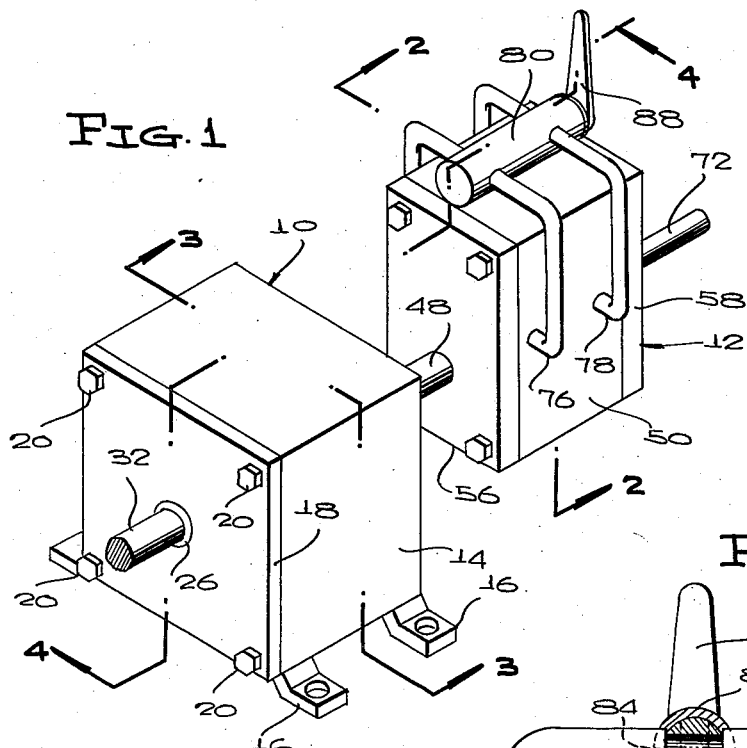
Figure 1 is a perspective view of a variable speed transmission according to the present invention.

Referring to the drawings in detail, the device constituting the present invention may appropriately be considered as comprising two coacting units, namely a drive or transmission unit generally designed 10, and a control or pump unit generally designated 12.

The drive unit will first be described, and includes a gear case 14. In the illustrated embodiment, this is of rectangular configuration, but it will be understood that it could be cylindrically formed or otherwise shaped, it being mainly important that it properly house the gear and shaft components to be described hereinafter. Further, the case could be mounted upon an associated structural component of a vehicle, not shown, or on any other support, depending upon the use of which the variable speed transmission is being put. In the illustrated embodiment, by way of example, the case is shown as including at opposite sides thereof downwardly and outwardly projecting, apertured feet 16, adapted to receive bolts, not shown, whereby the case is adapted to be mounted upon a flat-surfaced, stationary support, not shown.

The case, at one end, includes a cover plate 18, secured to the body portion of the case by a peripheral series of connecting bolts 20, so that the cover plate may be readily removed to provide access to the interior of the case.

Within the case there is provided a gear housing. In the illustrated example, but not necessarily, said gear housing is in the form of a generally rectangular frame shown to best advantage in Figure 4. At one end, the frame is formed with a bearing sleeve 24 journalled in a bearing opening 25 formed in the corresponding ends of the gear case 14. At its other end, the housing 22 is formed with a bearing projection 26 journalled in a bearing opening 27 formed in the cover plate 18. The bearing projection and the bearing sleeve are journalled upon a common axis falling on the longitudinal median of the gear case 14, the gear housing thus being freely rotatable within the stationary gear case about said axis.

In the inner surface of that end of the housing 22 that is formed with bearing projection 26, there is formed a bearing recess 28 facing inwardly of the housing and coaxially aligned with the bearing projection 26 and the sleeve 24.

Also formed in the housing 22 are coaxial bearing openings 30, 30, these being aligned on an axis intersecting perpendicularly with the previously mentioned common axis of the bearing projection 26 and sleeve 24.

It will be understood that the gear housing, instead of being in the form of a rectangular frame, could be cylindrically shaped, that is, it could be shaped as a hollow cylinder having the sleeve 24 and the projection 26 at its opposite ends.

In any event, a pair of identically but oppositely formed, beveled idler gears 34 include on their outer surfaces stubs 36 bearing in the openings 30. Gears 34 are in mesh with diametrically opposite portions of a beveled gear 38 integrally formed on its outer surface with an outwardly projecting stub 40 journalled in recess 28. Also integral with gear 38, and projecting longitudinally and centrally of the housing, is an elongated shaft 42 journalled in a center opening 44 of a bevel gear 46 disposed in confronting relation to the gear 38, in mesh with the idler gear 34. Gear 46 is integral with an elongated, hollow shaft 48 within which the shaft 42 is rotatable, the shaft 48 being journalled in the sleeve 24.

Figure 2:
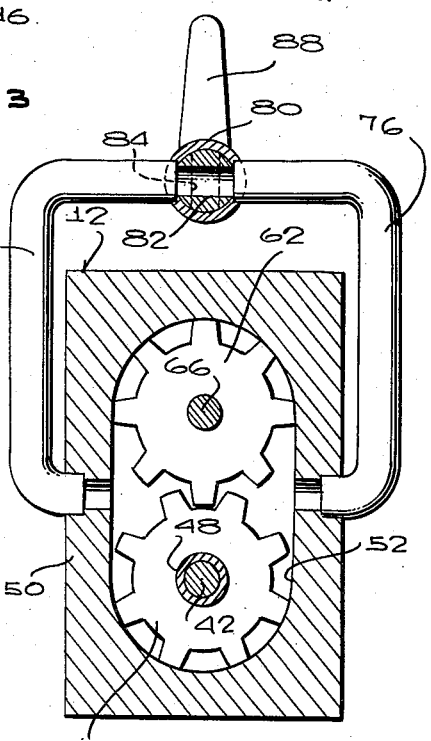
Figure 2 is an enlarged transverse sectional view through the control unit, taken substantially on line 2—2 of Figure 1.
Figure 3:
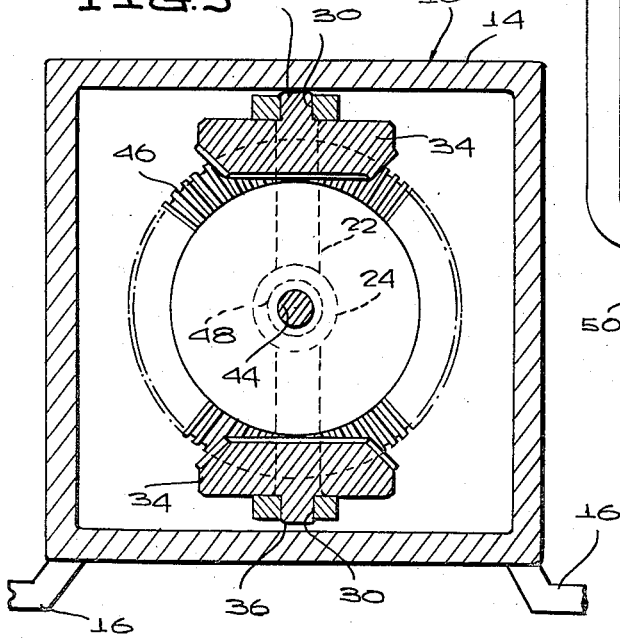
Figure 3 is an enlarged transverse section through the drive or transmission unit taken substantially on line 3—3 of Figure 1.

Referring now to the control unit 12, this includes a block or body 50 of rectangular configuration, having at one end an oval recess 52 (see Figure 2), and having at its other end a corresponding recess 54. The oval recesses 52, 54 open upon the respective end faces of the block, and are closed by cover plates 56, 58 which are bolted to the block 50. Communicating between the recesses is an opening 59. It will be understood that the opening 59 can be provided with a seal preventing passage of fluid therethrough from one to the other recess. In this connection, the entire showing of the structure is diagrammatic to the extent that fluid seals, packing, gaskets, etc. are not shown, but it will be understood that these will be employed whenever found suitable for the purpose of preventing leakage of lubricant, pressure fluid, etc. Further, standard bearings can be employed at any location found desirable to assure efficient shaft operation, and still further, bushings and other mechanical expedients can be employed to reduce friction and attendant wear on relatively rotatable parts.

Within recess 52 pump gears 60 and 62 are in mesh with each other. Gear 60 includes an axial bore 64, receiving shaft 42. Gear 60 is integral with shaft 48 to rotate conjointly with gear 46. The gear 62 is formed on its opposite faces with bearing projections 66, journalled in recesses formed in the cover plate 56 and in the inner wall of recess 52.

Within recess 54, a second set of meshing pump gears 68, 70 is mounted. Gear 68 is integral with shaft 42, on one face thereof. Projecting from the opposite face of the gear 68 is a shaft 72 journalled in cover plate 58 and projecting outwardly from the control unit. Gear 70 includes on its opposite faces suitable bearing projections 74 journalled in recesses in the cover plate 58 and inner wall of the recess 54.

Conduits 76, 78 are mounted exteriorly of block 50, in communication with the respective recesses 52, 54. Conduit 76, at its opposite ends, extends into communication with opposite sides of recess 52, with conduit 78 being similarly arranged.

Intermediate their ends, the conduits 76, 78 are connected to a tubular valve casing 80, in which is rotatable an elongated, cylindrical valve core 82 having adjacent its opposite ends perpendicularly related, diametrically extending bores 84, 86 respectively communicable with the conduits 76, 78. Secured to one end of the valve core 82 is a handle 88 for rotating the same between opposite extreme positions 90 degrees apart, in one of which positions bore 84 communicates with conduit 76 with bore 86 out of communication with conduit 78. In the other position the bores are disposed to permit flow through conduit 78 while closing conduit 76.

In use, the device, as will be seen, includes three shafts exposed for the purpose of driving or being driven from other mechanisms with which the variable speed transmission is to be associated. These are a first shaft 32, a second shaft 48, and a third shaft 42, which includes the shaft 72. In a typical installation, shaft 32 would be adapted to be driven by a prime mover or other source of motive power, such as an electric motor, internal combustion engine, etc. In these circumstances, shaft 32 may be termed a drive shaft for the transmission.

Assuming that conduit 76 is open and conduit 78 closed as shown in Figure 4, on rotation of shaft 32 the housing 22 will rotate therewith. This causes planetary gears 34 to travel in a circular path about the axis of rotation. Fluid may flow freely from the input to the output sides of the pump defined by the pump gears 60, 62 due to the fact that conduit 76 is opened to the flow of liquid therethrough. Pump gears 68, 70 are prevented from turning due to the closing of conduit 78. The device will therefore have the following operating characteristics: shaft 32 will rotate together with housing 22. Gears 34 will travel in a circular path. Gear 38 will be kept stationary because it is connected to pump gear 68 by shaft 42 and gear 68 is prevented from turning due to the closing of conduit 78. Therefore, as gears 34 travel about the periphery of stationary gear 38, they will be rotated on their axes 36 by the stationary gear 38. This will cause rotation of gear 46 at twice the speed of shaft 32. Rotation of gear 46 at twice the speed of shaft 32 results from the fact that it would be rotated in any event at a speed at least equal to that of the shaft 32 due to the interengagement of the teeth of spear 46 with the teeth of gears 34, which are rotating at the same speed as shaft 32. To this must be added the additional speed resulting from the rotation of gears 34 about their individual axes defined by stubs 36.

Thus, shaft 48 is driven at twice the speed of shaft 32, for any desired purpose, and can be operatively connected, by pulley or gear means, not shown, to any mechanism to be driven. The relative speeds of the shafts can be other than two to one, of course, by selection of gears of a particular ratio.

As the pump gears 60, 62 are maintained against rotary motion, upon changing of the angular position of the valve core to close conduit 76 and open conduit 78, the shaft 48 will now be held stationary while shaft 42 is free to rotate. Therefore, in the same manner as previously described, gear 46 will be stationary while gear 38 will make two revolutions for each revolution of shaft 32, thus traveling at twice the speed of shaft 32. Shaft 72 thus will be rotated at a speed twice that of the shaft 32. Shaft 72, constituting a second driven shaft, now may be used for operating any desired mechanism.

In a valve arrangement that would permit both conduits to be open at the same time, both the gears 38 and 46 would be free to turn. As a result, the gears 34 would not be rotated about their axes 36. Rather, the gears 34 would simply travel through their circular paths, and because their teeth are meshed with those of gears 38, 46, the gears 38, 46 would turn at the same rate of speed as shaft 32, housing 22, and gears 34. There would thus be conjoint rotation of all three shafts, at the same rate of speed.

Additionally, by properly adjusting the control valve to partially open the conduits 76 and 78 in their communication with their cooperating pump gears, different relative speeds of rotation of the shafts 48 and 72 may be obtained.

The control valves could be operated in various ways, depending probably on the use to which the transmission is being put, and may be operated manually, hydraulically, pneumatically, electrically, etc.

Further, if there is no need for the shaft 72 to be stopped automatically, as for example in the mounting of the structure as an automobile transmission, then the pump comprising gears 68, 70 could be eliminated.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A variable speed transmission comprising: relatively rotatable, coaxially aligned first, second, and third shafts; means to selectively prevent rotation of the second and third shafts; a gear housing rigid at one end with the first shaft and having an opening at its other end, the second shaft being hollow and being journalled in said bearing opening, the third shaft being extended through the second shaft; a planetary gear carried by the housing and rotating on the housing about an axis extending radially of the common axis of the housing and of the several shafts; and second and third gears rigid with the second and third shafts respectively, mounted within the housing in mesh with the first gear, said means for selectively preventing rotation of the second and third shafts comprising pumps having driving connections with the second and third shafts linking the respective pumps for operation during rotation of the second and third shafts, fluid conduits one extending from the input to the output of one pump and the other extending from the input to the output of the other pump, and valve means for selectively controlling flow of fluid through the respective conduits, the valve means including a separate valve for each conduit, the valves of the respective conduits being connected for conjoint operation.

2. A variable speed transmission comprising: relatively rotatable, coaxially aligned first, second, and third shafts; means to selectively prevent rotation of the second and third shafts; a gear housing rigid at one end with the first shaft and having an opening at its other end, the second shaft being hollow and being journalled in said bearing opening, the third shaft being extended through the second shaft; a planetary gear carried by the housing and rotating on the housing about an axis extending radially of the common axis of the housing and of the several shafts; and second and third gears rigid with the second and third shafts respectively, mounted within the housing in mesh with the first gear, said means for selectively preventing rotation of the second and third shafts comprising pumps having driving connections with the second and third shafts linking the respective pumps for operation during rotation of the second and third shafts, fluid conduits one extending from the input to the output of one pump and the other extending from the input to the output of the other pump, and valve means for selectively controlling flow of fluid through the respective conduits, the valve means including a separate valve for each conduit, the valves of the respective conduits being connected for conjoint operation.

3. A variable speed transmission comprising: relatively rotatable, coaxially aligned first, second, and third shafts; means to selectively prevent rotation of the second and third shafts; a gear housing rigid at one end with the first shaft and having an opening at its other end, the second shaft being hollow and being journalled in said bearing opening, the third shaft being extended through the second shaft; a planetary gear carried by the housing and rotating on the housing about an axis extending radially of the common axis of the housing and of the several shafts; and second and third gears rigid with the second and third shafts respectively, mounted within the housing in mesh with the first gear, said means for selectively preventing rotation of the second and third shafts comprising pumps having driving connections with the second and third shafts linking the respective pumps for operation during rotation of the second and third shafts, fluid conduits one extending from the input to the output of one pump and the other extending from the input to the output of the other pump, and valve means for selectively controlling flow of fluid through the respective conduits, the valve means including a separate valve for each conduit, the valves of the respective conduits being connected for conjoint operation, the valve means comprising a tubular valve casing and an elongated, cylindrical valve core rotatably mounted therein, the respective end portions of the core constituting the respective valves, said core having perpendicularly related, diametrically extending bores extending through the respective end portions to provide passages communicating with the respective conduits in the open positions of the valves.

4. A variable speed transmission comprising: relatively rotatable, coaxially aligned first, second, and third shafts; means to selectively prevent rotation of the second and third shafts; a gear housing rigid at one end with the first shaft and having an opening at its other end, the second shaft being hollow and being journalled in said bearing opening, the third shaft being extended through the second shaft; a planetary gear carried by the housing and rotating on the housing about an axis extending radially of the common axis of the housing and of the several shafts; and second and third gears rigid with the second and third shafts respectively, mounted within the housing in mesh with the first gear, said means for selectively preventing rotation of the second and third shafts comprising pumps having driving connections with the second and third shafts linking the respective pumps for operation during rotation of the second and third shafts, fluid conduits one extending from the input to the output of one pump and the other extending from the input to the output of the other pump, and valve means for selectively controlling flow of fluid through the respective conduits, the valve means including a separate valve for each conduit, the valves of the respective conduits being connected for conjoint operation, the valve means comprising a tubular valve casing and an elongated, cylindrical valve core rotatably mounted therein, the respective end portions of the core constituting the respective valves, said core having perpendicularly related, diametrically extending bores extending through the respective end portions to provide passages communicating with the respective conduits in the open positions of the valves, the core being formed as a one-piece bar one end of which projects beyond the corresponding end of the casing, said valve means including a handle connected to said projecting end of the bar for rotating the valve core.

References Cited in the file of this patent

UNITED STATES PATENTS

| | | |
|---|---|---|
| 2,377,400 | Campbell | June 5, 1945 |
| 2,508,186 | Newell | May 16, 1950 |

FOREIGN PATENTS

| | | |
|---|---|---|
| 961,176 | France | Nov. 14, 1949 |